Patented May 26, 1936

2,042,048

UNITED STATES PATENT OFFICE 2,042,048

ACCELERATOR OF VULCANIZATION

Albert F. Hardman, Cumberland, Md., assignor, by mesne assignments, to The Kelly-Springfield Tire Company, Cumberland, Md., a corporation of Maryland No Drawing. Application June 26, 1933, Serial No. 677,680

14 Claims. (Cl. 18—53)

The present invention relates to the art of rubber manufacture and particularly relates to a new class of rubber vulcanization accelerators for use in the vulcanization of rubber and rubber-like products.

The new and preferred class of accelerators may be represented by the structural formula

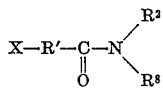

wherein X represents one or more dithio acid residues of the formula

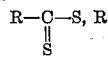

representing an organic radical, R' represents an aliphatic radical and $R^2$ and $R^3$ represent hydrogen, alkyl, aryl or aralkyl radicals. The compounds according to the present invention are obtainable by reacting a salt of a dithio acid with a halogen substituted acid amide.

As examples of the new and preferred class of accelerators and included within the scope of the present invention are the reaction products of dithio acids and their salts, for example, ammonium dithiofuroate, potassium amyl, ethyl and butyl xanthates, potassium diethyl-dithio-carbamate, sodium dimethyl-dithio-carbamate and the like with halogen substituted acid amides, as for example chloracetamide, dichloracetamide, 2-chlorpropionamide, dichlorpropionamide, chloracetanilide, chloraceto-alpha-naphthylamide, chloraceto-beta-naphthylamide, chloracetodiphenylamide and chloraceto-dibenzylamide.

As specific examples of the use of materials possessing the structural formula

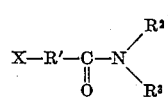

wherein X represents one or more dithio acid residues of the formula

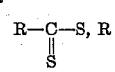

representing an organic radical, R' represents an aliphatic radical and $R^2$ and $R^3$ represent hydrogen, alkyl, aryl or aralkyl radicals are dithiofuroicacetamide, dithiofuroicacetanilide, dithiofuroicaceto-alpha-naphthylamide, dithiofuroicaceto-diphenylamide and dithiofuroicaceto-dibenzylamide. These materials were prepared by reacting ammonium dithiofuroate with a suitable chloracidamide. It is not necessary that the ammonium salt of dithiofuroic acid be employed. Other salts may be used. The alkali metal salts, however, are preferred. Again it is not necessary that a chloracidamide be employed. Other halogen substituents than chlorine may be employed in the preparation of the new class of materials.

Example I 100 grams of ammonium dithiofuroate, containing about 10-20% of water insoluble impurities, were dissolved in 400 c. c. of warm water and filtered. A second solution was prepared comprising 55 grams of chloracetamide dissolved in 200 c. c. of warm water. The two solutions were mixed in a suitable reactor and in a short time small red crystals formed with the evolution of considerable heat. As soon as the reaction was completed, as indicated by a drop in temperature of the reaction mass, the crystals were filtered off, washed with cold water and dried. A yield of 104 grams of dithiofuroicacetamide, melting at 123° C., was thus obtained. It is believed the reaction described above may be represented as follows:

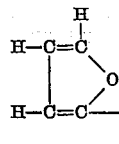 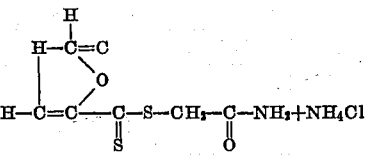

Example II 10 grams of ammonium dithiofuroate were dissolved in 75 c. c. of warm ethyl alcohol and filtered. To the filtered solution 8.5 grams of chloracetanilide were added. Solution thereof was quickly effected, and the reaction between the ingredients took place with an accompanying rise in temperature. When the reaction was completed, as shown by a drop in temperature, the crystals formed were filtered off, washed first with alcohol and then with water and dried. A yield of 13 grams of dithiofuroicacetanilide, melting at 135° C., was obtained. It is believed the above reaction takes place as given below.

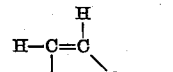 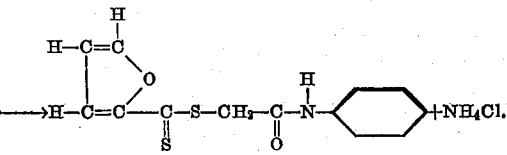

Example III 10 grams of ammonium dithiofuroate were dissolved in 50 c. c. of methanol and filtered. A second solution was prepared comprising 12 grams of chloraceto-diphenylamide dissolved in 50 c. c. of methanol. The two solutions were mixed in a suitable reactor and in a short time crystals of dithiofuroicaceto-diphenylamide separated. After the reaction was completed, as indicated by a drop in temperature, the crystals were filtered off, washed first with methanol then with water and dried. This product after recrystallization from a solvent, as for example ethyl alcohol, melted at 138° C. It is believed the reaction described above may be represented as follows:

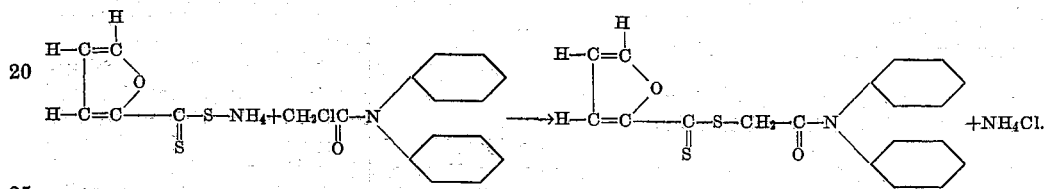

Among other examples of the new class of accelerators which have been prepared in a manner analogous to that described above are:

|  | Melting point |
| --- | --- |
| Dithiofuroicaceto-alpha-naphthylamide | 200° C. |
| Dithiofuroicaceto-dibenzylamide | 118° C. |

The products hereinbefore described were compounded in the usual manner in a rubber stock comprising

|  | Parts |
| --- | --- |
| Smoked sheet rubber | 100 |
| Sulfur | 3 |
| Zinc oxide | 5 |
| Stearic acid | 2 |

To the base rubber stock there were added the accelerators in the quantities hereinafter described. After vulcanizing by heating in a press for the periods indicated, at the temperature of 20 pounds of steam pressure per square inch (258° F.), the cured rubber product possessed the tensile and modulus characteristics given in Table I.

Table I

| Accelerator | Quantity of accelerator parts | Cure mins | Modulus of elasticity in lbs./in.² at elongation of 500% | Tensile at break in lbs./in.² |
| --- | --- | --- | --- | --- |
| Dithiofuroicacetamide | 0.5 | 10 | 390 | 3270 |
| Dithiofuroicacetanilide | 0.69 | 10 | Blown |  |
| Dithiofuroicaceto-alpha naphthylamide | 0.815 | 10 | Blown |  |
| Dithiofuroicaceto-diphenylamide | 0.88 | 10 | Blown |  |
| Dithiofuroicaceto-dibenzylamide | 0.95 | 10 | Blown |  |
| Dithiofuroicacetamide | 0.5 | 15 | 630 | 4340 |
| Dithiofuroicacetanilide | 0.69 | 15 | 470 | 3440 |
| Dithiofuroicaceto-alpha-naphthylamide | 0.815 | 15 | Blown |  |
| Dithiofuroicaceto-diphenylamide | 0.88 | 15 | 550 | 3640 |
| Dithiofuroicaceto-dibenzylamide | 0.95 | 15 | 850 | 3940 |
| Dithiofuroicacetamide | 0.5 | 20 | 670 | 3900 |
| Dithiofuroicacetanilide | 0.69 | 20 | 700 | 4180 |
| Dithiofuroicaceto-alpha-naphthylamide | 0.815 | 20 | 300 | 2550 |
| Dithiofuroicaceto-diphenylamide | 0.88 | 20 | 740 | 3800 |
| Dithiofuroicaceto-dibenzylamide | 0.95 | 20 | 900 | 3850 |
| Dithiofuroicacetamide | 0.5 | 30 | 610 | 3880 |
| Dithiofuroicacetanilide | 0.69 | 30 | 700 | 4200 |
| Dithiofuroicaceto-alphanaphthylamide | 0.815 | 30 | 790 | 4170 |
| Dithiofuroicaceto-diphenylamide | 0.88 | 30 | 740 | 3530 |
| Dithiofuroicaceto-dibenzylamide | 0.95 | 30 | 860 | 3300 |

From the data set forth in Table I it has been shown that the compounds described, when incorporated in a rubber stock, are all strong and desirable accelerators.

By the term alkali metal as set forth in the claims attached hereto as a part of the present specification is meant the alkali metals, lithium, potassium, sodium, caesium and rubidium together with the NH₄ group.

The present invention is not limited to the specific examples given above, as they are to be construed as specific embodiments of the present invention and not limitations of the scope thereof. Likewise the quantities of materials employed and the procedure of preparation may be widely varied without departing from the scope of this invention, nor is it intended to limit the use of any member of the new class of accelerators to any particular rubber composition. The present invention is limited solely by the claims attached hereto as a part of this specification.

What is claimed is:

1. A rubber vulcanization accelerator of the general structure

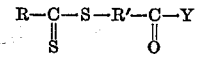

wherein R represents a furyl radical, R' represents an alkylene group and Y represents an amino group.

2. A rubber vulcanization accelerator of the general structure

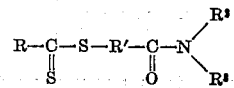

wherein R represents a furyl radical, R' represents the methylene group and R² and R³ represent hydrogen atoms.

3. A rubber vulcanization accelerator comprising dithio-furoicacetamide.

4. A rubber vulcanization accelerator comprising dithio-furoicacetanilide.

5. A rubber vulcanization accelerator comprising dithio-furoicaceto-diphenylamide.

6. The vulcanized rubber product produced by heating rubber and sulfur in the presence of a rubber vulcanization accelerator of the general structure $$R-\underset{\underset{S}{\|}}{C}-S-R'-\underset{\underset{O}{\|}}{C}-Y$$

wherein R represents a furyl radical, R' represents an alkylene group and Y represents an amino group.

7. The vulcanized rubber product produced by heating rubber and sulfur in the presence of a rubber vulcanization accelerator of the general structure $$R-\underset{\underset{S}{\|}}{C}-S-R'-\underset{\underset{O}{\|}}{C}-N\underset{R^3}{\overset{R^2}{<}}$$

wherein R represents a furyl radical, R' represents the methylene group and $R^2$ and $R^3$ represent hydrogen atoms.

8. The vulcanized rubber product produced by heating rubber and sulfur in the presence of an accelerator comprising dithio-furoicacetamide.

9. The vulcanized rubber product produced by heating rubber and sulfur in the presence of an accelerator comprising dithio-furoicacetanilide.

10. The vulcanized rubber product produced by heating rubber and sulfur in the presence of an accelerator comprising dithio-furoicaceto-diphenylamide.

11. A rubber vulcanization accelerator of the general structure $$(R\underset{\underset{S}{\|}}{C}S)_n R'\underset{\underset{O}{\|}}{C}Y$$

wherein R represents a furyl radical, R' represents an aliphatic hydrocarbon radical, Y represents an amino group and $n$ represents a whole number less than three.

12. A rubber vulcanization accelerator of the general structure $$XR'\underset{\underset{O}{\|}}{C}Y$$

wherein X is a dithiofuroic acid residue, R' represents an aliphatic hydrocarbon radical, and Y represents an amino group.

13. The vulcanized rubber product produced by heating rubber and sulfur in the presence of a rubber vulcanization accelerator of the general structure $$(R\underset{\underset{S}{\|}}{C}S)_n R'\underset{\underset{O}{\|}}{C}Y$$

wherein R represents a furyl radical, R' represents an aliphatic hydrocarbon radical, Y represents an amino group and $n$ represents a whole number less than three.

14. The vulcanized rubber product produced by heating rubber and sulfur in the presence of a rubber vulcanization accelerator of the general structure $$XR'\underset{\underset{O}{\|}}{C}Y$$

wherein X is a dithiofuroic acid residue, R' represents an aliphatic hydrocarbon radical, and Y represents an amino group.

ALBERT F. HARDMAN.